United States Patent [19]

Livesay

[11] 4,149,758
[45] Apr. 17, 1979

[54] SPLIT PIN FOR THE ARTICULATED JOINT OF A TRACK CHAIN

[75] Inventor: Richard E. Livesay, Peoria, Ill.

[73] Assignee: Caterpillar Tractor Co., Peoria, Ill.

[21] Appl. No.: 851,245

[22] Filed: Nov. 14, 1977

[51] Int. Cl.² ............................................ B62D 55/20
[52] U.S. Cl. ...................... 305/11; 305/14; 305/58 R
[58] Field of Search ............... 305/11, 14, 58 R, 59, 305/18; 74/254, 255 R, 257

[56] References Cited

U.S. PATENT DOCUMENTS

| 1,130,145 | 3/1915 | Casteran | 305/14 X |
|---|---|---|---|
| 1,971,553 | 8/1934 | Fisk | 198/851 |
| 2,517,429 | 8/1950 | Henning | 305/42 |
| 2,647,023 | 7/1953 | Kubaugh | 305/42 |
| 2,939,747 | 6/1960 | Tucker | 305/58 |
| 3,050,346 | 8/1962 | Simpson et al. | 305/11 |
| 3,409,336 | 11/1968 | Dadds | 305/11 |
| 3,492,054 | 1/1970 | Boggs et al. | 305/11 |
| 3,540,302 | 11/1970 | Bendall | 74/253 R |

FOREIGN PATENT DOCUMENTS 960652  10/1949  France ..................................... 305/14

Primary Examiner—John P. Shannon
Attorney, Agent, or Firm—Phillips, Moore, Weissenberger, Lempio & Majestic

[57] ABSTRACT

An articulated chain is secured to a plurality of track shoes of an endless track assembly for a track-type vehicle. Each articulated joint, connecting laterally spaced pairs of links of the track chain together, comprises a pin including a pair of longitudinally aligned pin members. A tubular bushing is mounted on the pin members and a bolt extends longitudinally therethrough to clamp the pin members and the links together.

13 Claims, 2 Drawing Figures

SPLIT PIN FOR THE ARTICULATED JOINT OF A TRACK CHAIN

BACKGROUND OF THE INVENTION

This invention relates to an articulated joint adapted for use in a chain for a track assembly of a track-type vehicle.

A conventional joint of this type comprises a pin having a first pair of links secured on either end thereof, a sprocket-engaging bushing mounted on the pin and a second pair of links secured onto the bushing. The links are secured in press-fit relationship on the pin and bushing and are subjected to high stresses in the vicinities of the mounting bores formed therethrough.

In order to service the track assembly, such as the replacement of annular seals disposed between each pair of first and second links, a standard master link is released and the chain formed by the links is transported to a remote servicing area, minus the disconnected track shoes. Such procedure results in substantial "down time" of the vehicle and a resulting economic loss to the operator thereof. Servicing of the chain normally requires a hydraulic press to disconnect the links from the pin and bushing.

Upon completion of servicing, such as the replacement of the seals, the links, pin and bushing must be reassembled in their correct order and to fully protect the seals. The articulated chain is then shipped back to the job site and the track assembly is reinstalled on the vehicle with the track shoes secured thereon. The above procedure is not only timeconsuming and uneconomical, but also subjects the component parts of the chain to potential damage upon transport thereof between the job site and the servicing area.

SUMMARY OF THE INVENTION

The present invention is directed to overcoming one or more of the problems as set forth above.

The improved articulated joint of this invention exhibits substantially less stress concentrations therein when compared to the above described conventional joint, exhibits a high degree of structural integrity and is adapted for expeditious assembly and servicing. The articulated joint comprises a pin means including a pair of longitudinally aligned pin members and a tubular bushing means mounted on the pin members. Laterally spaced pairs of first and second link means are mounted in the joint for pivotal movement of one pair of the link means relative to the other pair thereof. Means are provided for releasably attaching the pin members, the bushing means and the link means together.

In one aspect of this invention, the first link means are clamped between the bushing means and the pin members by an elongated bolt and the second link means are pivotally mounted on outer ends of the pin members.

In another aspect of this invention, a nut is threadably mounted on an end of the bolt and locking means, engaged between the nut and one of the pin members, prevents the nut from rotating relative to such pin member.

In still another aspect of this invention, a lubricant-retaining cavity is defined in each of the pin members and communicates with an annular clearance defined between the second link means and the pin members via passage means.

BRIEF DESCRIPTION OF THE DRAWING

Other objects of this invention will become apparent from the following description and accompanying drawings wherein.

DETAILED DESCRIPTION

Figure 1:
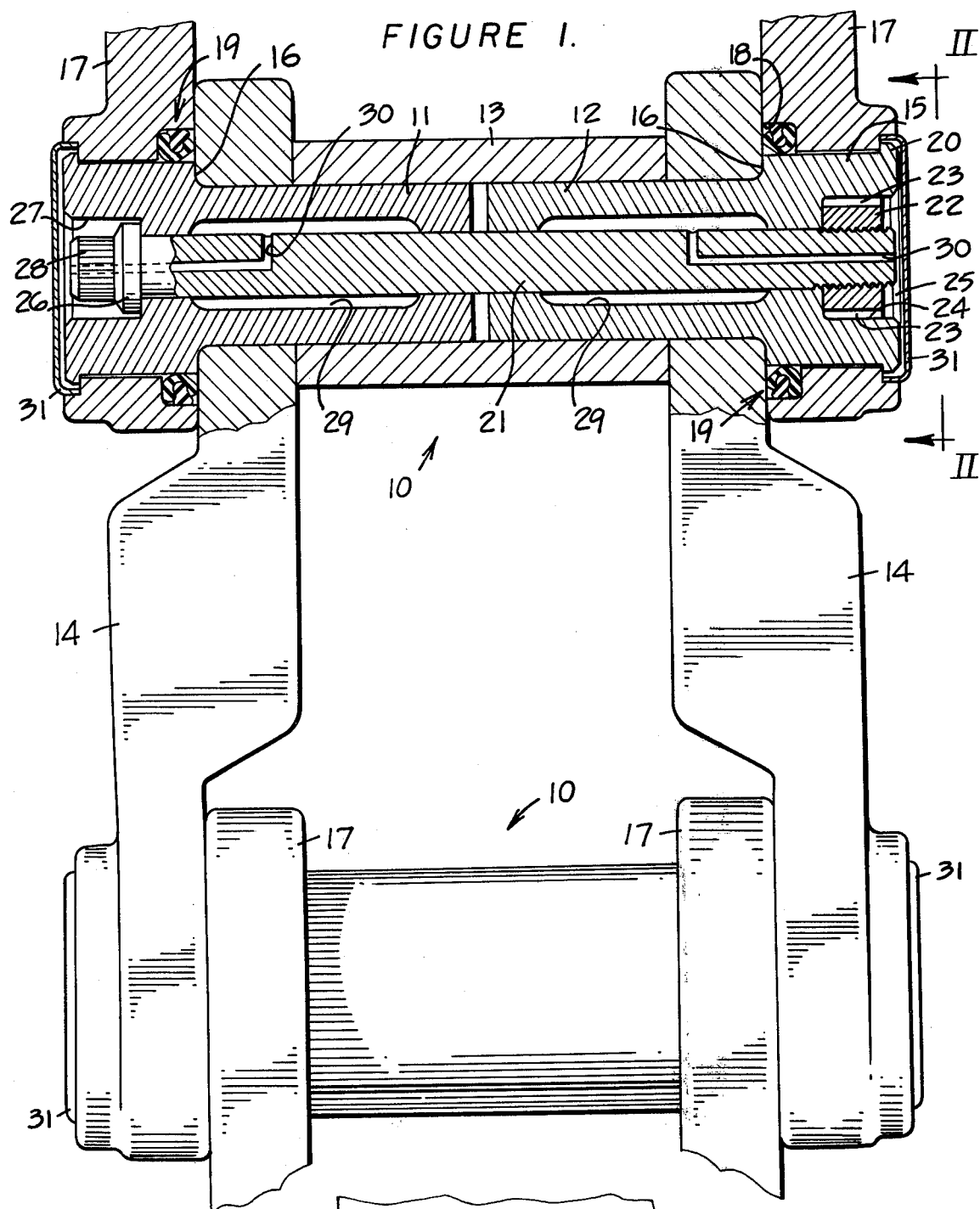
FIG. 1 is a longitudinal sectional view of an articulated joint embodying this invention.

FIG. 1 illustrates an articulated joint 10 of a chain for the track assembly of a track-type vehicle comprising a pin means, including a pair of longitudinally aligned pin members 11 and 12. A cylindrical bushing means 13 is mounted in slip-fit relationship on the pin members, along with the first ends of a pair of laterally spaced first links or link means 14. An enlarged boss portion 15 of each pin member, having an outside diameter larger than the outside diameter defining the inner portions of the pin members mounting bushing 13 and links 14 thereon, defines a radial shoulder 16 disposed in bearing contact with an outer side of a respective link 14.

The second ends of a pair of second links or link means 17, identical in construction to links 14, are mounted outboard of the first ends of link means 14 and are further mounted in slip-fit relationship on boss portions 15 of the pin members to permit relative pivotal movement therebetween. It should be noted in FIG. 1 that each link means is bent whereby the next adjacent articulated joint will find the second ends of first links 14 disposed outboard of the first ends of the next adjacent pair of second links 17. An annular counterbore 18 is formed on an inner side of each link 17 to retain an annular seal 19 of conventional construction therein. Each pin member has an annular flange 20 formed on an end thereof which abuts an outer end of each link 17 to retain such link in its set axial position in the articulated joint.

Figure 2:
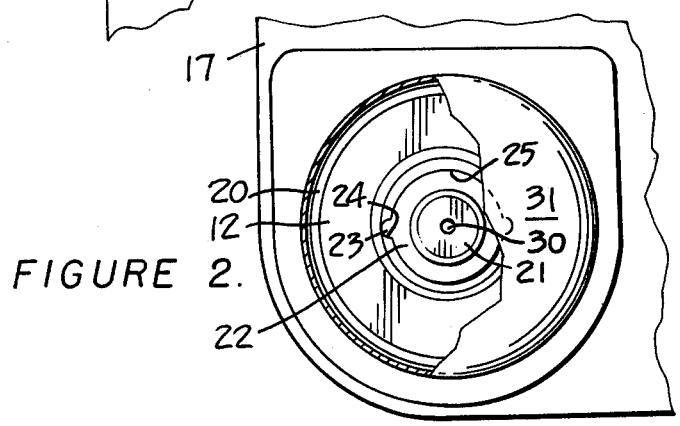
FIG. 2 is an end view of the articulated joint, taken in the direction of arrows II—II in FIG. 1.

An elongated bolt 21, providing means along with flanges 20 for releasably attaching the pin members, the bushing and the links together, extends through the pin members. A nut 22 is threadably mounted on one end of the bolt and has a pair of diametrically opposed keys 23 formed thereon (FIG. 2) to each engage a mating slot 24 formed in a counterbore 25, formed in an outer end of pin member 12. The opposite second end of the bolt has an annular head 26 formed thereon and disposed in a counterbore 27 for cooperating with nut 22 to clamp the pin members, bushing and links together, as shown. A twelve-point head 28 is formed integrally on the second end of the bolt to adapt it for reception of a socket wrench.

Each pin member has an annular lubricant-retaining cavity 29 formed therein. Each cavity communicates with a passage 30 formed in bolt 21 to communicate lubricant, such as oil, to the bearing surfaces defining the pivotal connection between each link 17 and a respective pin member. In addition, passage 30 facilitates the filling of cavity 29 with lubricant upon assembly. It should be understood that the two passages 30 could be interconnected by an additional passage formed in bolt 21 whereby only one end of the pin need be filled with lubricant to, in turn, fill both cavities 29. An end cap 31 is secured in sealing relationship on an end of each link 17 to prevent the egress of lubricant thereby during operation of the articulated joint.

The method of assembling articulated joint 10 will now be described. The bores defined through bushing 13 and links 14 and 17 are first aligned and pin members 11 and 12 are inserted in slip-fitted relationship therein by hand. Nut 22 is then slip-fitted within bore 25 to engage keys 23 thereof with slots 24 to provide locking means preventing rotation of the nut relative to pin member 12. Bolt 21 is then inserted through the pin members and threaded into the nut by means of a socket wrench which engages head 28 thereof.

The bolt is then torqued-down a predetermined amount to clamp bushing 13 and links 14 between shoulder 16 of the pin members. As discussed above, the inside diameters of the bores formed through links 17 are slightly greater than the outside diameters of pin boss portions 15 to permit the links to pivot on the pin members. It should be noted that should the shoe bolts (not shown) loosen during tractor operation flanges 20 will prevent outward movement of links 17 relative to pin members 11 and 12 to thereby prevent uncoupling of the track chain. Cavities 29 are then filled with oil via passages 30 and end caps 31 are secured in place to complete the assembly.

From the above description, it can be seen that in addition to providing expeditious assembly and servicing, articulated joint 10 of this invention is adapted to be used on present-day tractors or other track-type construction vehicles without having to change the undercarriages thereof since dimensional parameters, such as the outside diameter of bushing 13, the spacing of link means 14 and 17 and etc., may all be retained. Furthermore, the articulated joint eliminates the need for a "master-link" in the track chain since each articulated joint of this invention constitutes a master-link by itself. Also, a worn bushing of the articulated joint can be turned and properly sized by a workman while remaining in situ on the tractor.

The articulated joint of this invention further provides for rotation of bushing 13 during servicing to substantially extend its life expectancy. Since all components of the articulated joint can be expeditiously serviced at a job site, damaged track chain components can be replaced by hand without removing the track chain from the tractor. It should be further noted that stresses normally imposed in the vicinity of the bores formed through link means 14 and 17 are alleviated since the link means may be slip-fitted rather than press-fitted onto pin members 11 and 12. Also, since bolt 21 will exhibit a certain amount of "stretch" during operation of the track chain, loosening of the articulated joint is resisted.

The embodiments of the invention in which an exclusive property or privilege is claimed are defined as follows:

1. An articulated joint adapted for use in a track assembly of a track-type vehicle comprising
   pin means comprising a pair of longitudinally aligned pin members,
   tubular bushing means mounted on said pin members,
   a laterally space pair of first link means mounted directly on said pin members and each disposed in clamped relationship between said bushing means and a respective one of said pin members, and a laterally spaced pair of second link means pivotally mounted directly on outer ends of said pin members, and
   means, comprising an elongated bolt, releasably attaching said pin members, said bushing means and said first and second link means together and clamping said first link means between said bushing means and said pin members.

2. The articulated joint assembly of claim 1 wherein each of said pin members has an annular shoulder formed thereon and wherein each of said first link means is clamped between a said annular shoulder and said bushing means.

3. The articulated joint assembly of claim 2 wherein each of said first link means and said bushing means are mounted in slip-fit relationship on said pin members.

4. The articulated joint assembly of claim 1 further comprising annular sealing means disposed between each adjacent pair of said first and second link means.

5. The articulated joint assembly of claim 1 wherein said means releasably attaching said pin members, said bushing means and said link means together comprises said elongated bolt extending through said pin members and a nut threadably mounted on one end of said bolt.

6. The articulated joint assembly of claim 5 wherein said means releasably attaching said pin members, said bushing means and said link means together further comprises a flange formed on an outer end of each of said pin members disposed in abutting relationship with an outer side of a respective one of said second link means for preventing outward axial movements of said second link means relative to said pin members.

7. The articulated joint assembly of claim 5 further comprising locking means engaged between said nut and one of said pin members for preventing said nut from rotating relative to such pin member.

8. The articulated joint assembly of claim 7 wherein said locking means comprises at least one key formed on the periphery of said nut and an elongated slot formed in said one pin member and having said key disposed therein.

9. The articulated joint assembly of claim 5 further comprising tool-engaging means formed on a second end of said bolt adapted to receive a work tool thereon to turn said bolt relative to said nut.

10. The articulated joint assembly of claim 1 further comprising means defining a lubricant-retaining cavity in each of said pin members and passage means communicating each said cavity with an annular clearance defined between said second link means and said pin members for communicating lubricant thereto.

11. The articulated joint assembly of claim 1 wherein said means releasably attaching said pin members, said bushing means and said link means together comprises a flange formed on an outer end of each of said pin members disposed in abutting relationship with an outer side of respective one of said second link means for preventing outward axial movements of said second link means relative to said pin members.

12. An articulated joint adapted for use in a track assembly of a track-type vehicle comprising
    pin means comprising a pair of longitudinally aligned pin members,
    tubular bushing means mounted on said pin members,
    a laterally spaced pair of first link means and a laterally spaced pair of second link means mounted in said joint for pivotal movement of one pair of said link means relative to the other pair thereof, and
    means releasably attaching said pin members, said bushing means and said link means together comprising an elongated bolt extending through said pin members and a nut threadably mounted on one end of said bolt, and locking means engaged between said nut and one of said pin members for preventing said nut from rotating relative to such pin member.

13. An articulated joint adapted for use in a track assembly of a track-type vehicle comprising:
   pin means comprising a pair of longitudinally aligned pin members,
   tubular bushing means mounted on said pin members,
   a laterally spaced pair of first link means and a laterally spaced pair of second link means, pivotally mounted on said pin members, for pivotal movement of one pair of said link means relative to the other pair thereof,
   means releasably attaching said pin members, said bushing means and said first and second link means together,
   means defining a lubricant-retaining cavity in each of said pin members, and
   passage means communicating each said cavity with an annular clearance defined between said second link means and said pin members for communicating lubricant thereto.

* * * * *